Aug. 30, 1938. O. B. ANDREWS 2,128,449
LINER
Filed Nov. 9, 1935 2 Sheets-Sheet 1
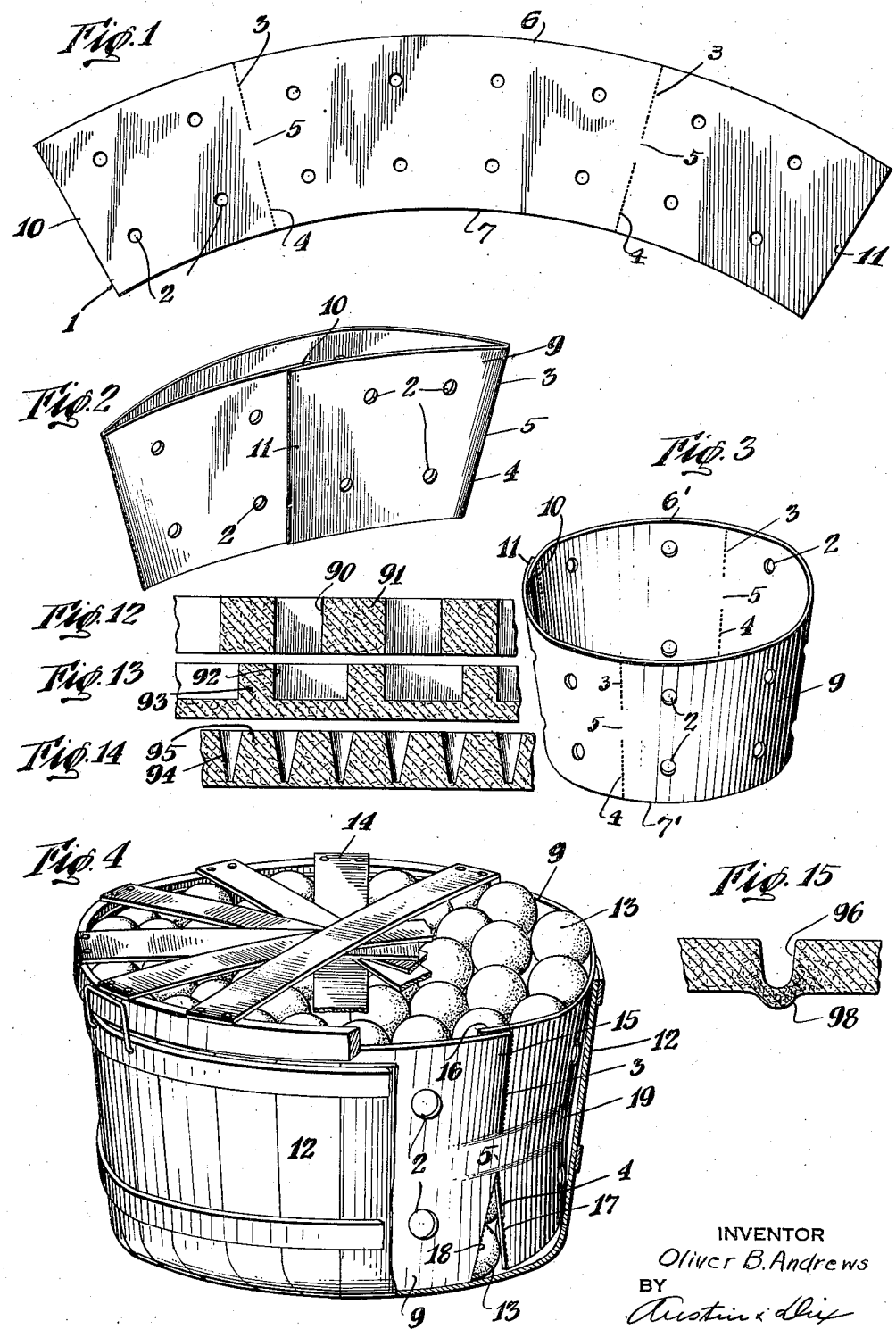
INVENTOR
Oliver B. Andrews
BY
Austin & Dix
ATTORNEYS Aug. 30, 1938.  O. B. ANDREWS  2,128,449
LINER
Filed Nov. 9, 1935   2 Sheets-Sheet 2
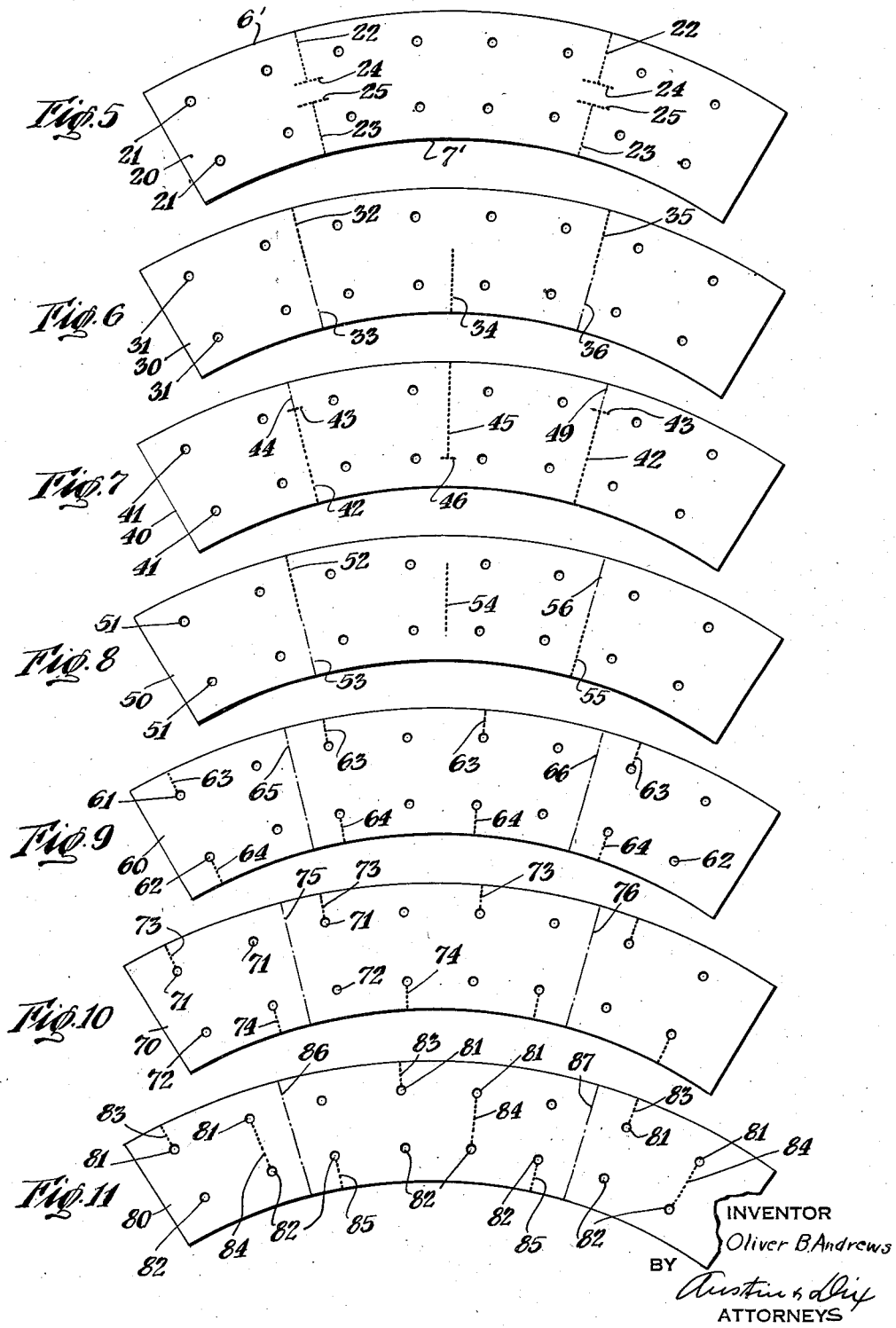
INVENTOR
Oliver B. Andrews
BY
ATTORNEYS Patented Aug. 30, 1938

2,128,449

UNITED STATES PATENT OFFICE 2,128,449

LINER

Oliver B. Andrews, Chattanooga, Tenn.

Application November 9, 1935, Serial No. 49,009

8 Claims. (Cl. 217—3)

This invention relates to liners, and more particularly to a liner adapted to fit on the inside of a container such as a fruit basket to protect the contents from injury resulting from contact with the rough walls of the basket.

In the packing of fruit and vegetables or like articles in baskets or other containers, it has been found desirable to provide for the container a liner constructed of a material such as paper or paperboard in order to protect the contents from bruising, breaking or injury through contact with the walls of the container. Such liners are particularly necessary where delicate and perishable fruits, such as apples or peaches, are to be packed.

Liners customarily comprise a collar-like member formed of paper or cardboard. The liner is positioned against the inner walls of the basket and extends from slightly above the rim substantially to the bottom wall of the basket.

In packaging the fruit or vegetables, the liner may be positioned within the basket, and thereafter the contents may be placed within the basket in any desired manner. In order to obtain a neat-appearing package, however, it is necessary to deposit the top layer of fruit in the form of an evenly distributed, neatly crowned layer. One of the preferred methods of providing this neat-appearing top layer of fruit consists in depositing a layer of fruit in a uniform arrangement on a saucerlike facing plate or base, and disposing on the base a basket liner constituted by an arcuate strip having its ends either permanently or temporarily secured together to form a circular collarlike structure. A reinforcing shell, preferably formed of metal, and having a form similar to the liner, is telescoped over the liner. After the first layer of fruit has been carefully placed and arranged on the base, fruit is introduced into the liner and surrounding shell to fill the basket in which the fruit will eventually be contained. The reinforcing shell is then withdrawn from around the liner. The liner should be of sufficient strength to support the column of fruit without other supporting means. The final operation consists in telescoping over the supported column of fruit a basket, inverting the assembly, and thereafter removing the facing base. The result is a neatly packed basket having an evenly distributed, neatly crowned top layer of fruit. Generally a cover is secured over the end of the basket to retain the fruit in the basket and protect the fruit during shipment and storage.

In the above-described method of packing, it is customary to insert the fruit in the inverted liner by dumping the fruit therein, and hence the fruit is not usually well distributed within the basket when the basket is inverted. It is then generally necessary to shake the basket to cause the fruit to settle therein and adjust itself, in order that undesired settling and consequent bruising of the fruit will not occur during transportation or handling of the package, and also to ensure that the full quantity of fruit will be contained within the basket.

In order to permit the fruit to adjust itself to the size and shape of the basket, it has been customary to provide a liner which will yield outwardly to relieve any abnormal pressure resulting from the tendency of the fruit to settle, thereby permitting the fruit to settle in the desired manner and to rest firmly and securely in the basket. Various expedients have been attempted to permit this desirable outward-yielding of the liner, but until the present invention none of them has proved entirely satisfactory.

One of the prior art expedients consists in providing a weak-walled liner formed from paper or paperboard of very low tensile strength, which is expected to break at any point when the basket is shaken to cause the fruit to settle, or when the cover is applied and secured to the basket. This type of liner has been found to be unsatisfactory in that it is subject to breaking prematurely owing to its lack of tensile strength. Thus it has often been found that the liner would break after the reinforcing shell had been removed from the liner and contained column of fruit, and before the basket had been inserted over the liner, thus necessitating removal of the liner and repeating the packing operation. Also, after the liner has torn or split to effect the desired expansion, the edges adjacent the tear are subject to curling and fraying which detracts from the neat and attractive appearance of the package.

Yielding of the liner has also been accomplished by providing a continuous line of weakening extending throughout substantially the entire length of the liner. In such constructions the line of weakening permits separation of the liner throughout its entire length, exposing the fruit to contact with the inner wall of the basket over a substantial area thereof.

Still another expedient has been to provide a liner constituted by a strip having overlapping ends provided with some arrangement such as cooperating tongues and slots for permitting a relative sliding movement of the overlapping ends to permit expansion of the liner. Such arrangements are not only complicated and expensive to manufacture, but provide a liner which is generally not smooth on the inside, and unreliable in its opening action.

Still another type of prior art liner is constituted from a strip of material having its ends detachably secured together by a detachable member such as a rod or stick which is withdrawn after the basket is packed, to permit the ends of the liner to separate. Such an arrangement entails considerable extra expense in manufacturing and involves additional operations in packing the basket. Such liners generally have an undesirable, inwardly-projecting ridge constituted by the rod or strip, and thus the interior wall of the liner is not smooth. The rod or stick occasionally separates accidentally from the liner prior to the packing operation, and extra rods must consequently be provided at the packing house.

The present invention contemplates the provision of a liner formed from a strip of paperboard material having its ends permanently secured together to form an endless wall of sufficient strength to support a column of fruit equal to the amount necessary to fill a basket, and having a weakened portion or portions which permit the liner to break and yield outwardly when the basket is shaken or the cover secured to the basket, or the like. The weakened portions preferably comprise a line or lines of weakening extending longitudinally, that is, from top to bottom, of the liner but not continuous throughout the entire length or height of the liner.

According to the present invention the weakened portions preferably are so disposed that the liner may break through its entire length, but not continuously, and hence the liner does not completely separate but always retains its endless nature. The weakened portions preferably are so disposed that the liner breaks along only short lines whereby only a small area of the basket wall could possibly be in contact with the fruit. In other words, the weakened portions are distributed to permit only sufficient breaking of the liner to relieve the pressure and without exposing any substantial area of the fruit to contact with the basket walls.

An object of this invention is to provide a liner for baskets or other containers adapted to contain fruit, vegetables or similar articles, which liner is adapted to break under abnormal pressure in excess of a predetermined pressure only sufficiently to relieve such abnormal pressure and without exposing any substantial portion of the fruit to engagement with the basket walls.

Another object of this invention is to provide a basket liner of the type described which is capable of breaking under abnormal pressure but which does not break along any line or lines extending continuously throughout the entire length or height of the liner.

Another object of the invention is to provide a basket liner adapted to break under abnormal pressure at predetermined portions of the liner and of such strength that the breaking is wholly confined to and localized in said predetermined portions.

Another object of the invention is to provide a basket liner of the type described which is simple and inexpensive to manufacture and use, which is not subject to premature breaking, curling or fraying of the edges adjacent the break, which expands outwardly automatically and which does not necessitate the employment of additional or independent steps during the packing operation for effecting the desired expansion.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a plan view of a blank used in forming a basket liner according to the present invention;

Fig. 2 is a perspective view of a completed liner in partially folded, collapsed position;

Fig. 3 is a perspetcive view of a completed liner in set-up position;

Fig. 4 is a perspective view of a basket of fruit with cover attached and liner inserted, a portion of the basket and cover being broken away to illustrate the liner in position in the basket;

Figs. 5 to 11 are plan views respectively of seven different modified forms of liners constructed according to the teachings of the present invention.

Fig. 12 is an enlarged fragmentary view showing a cross-section taken longitudinally along a portion of the line of weakening 3, shown in Fig. 1;

Fig. 13 is a view similar to Fig. 12 showing a modified form of weakening arrangement;

Fig. 14 is a view similar to Fig. 12 showing another modified form of weakening arrangement; and Fig. 15 is an enlarged fragmentary view showing a cross-section taken transversely of still another modified form of weakening arrangement.

In accordance with my invention, the liner is formed from thin paperboard of substantial tensile strength and having a relatively smooth surface. The thickness of the material from which the liner is constructed may vary over considerable limits according to the nature of the paper. However, it is preferable to use a material having a thickness of from 0.014 to 0.025 inch. Where the liner is to be used in connection with fruit which is very juicy and easily crushed, the paperboard may be treated, as by waxing or filling, to render it moisture-proof. Thus, if any of the fruit is accidentally crushed, the juices will not be absorbed by the liner and the liner will not appear wet on the outer wall thereof.

Referring to Fig. 1, a liner blank 1 is cut from a sheet of paperboard of the desired quality and thickness, and is provided with a plurality of spaced breathing apertures 2.

The blank 1 is provided with one or more lines of perforations 3 extending from its end edge 6 inwardly, and lines of perforations 4 in alignment with the first mentioned perforations 3 extending inwardly from the other end edge of the blank 1. The lines 3 and 4 terminate at spaced points centrally of the blank 1 so as to leave a space 5 in the central portion of the blank 1. In a liner of approximately 10 to 12 inches in length or height, the unperforated space 5 may be approximately 1 to 5 inches in length.

The liner is completed by lapping the side edge 11 over the side edge 10 and adhesively securing the edge portions together, as shown in Fig. 2, to form an endless wall or collar structure having the general form of a truncated cone, and constituting the completed liner 9.

The perforated lines 3 and 4 provide natural fold lines whereby the liner may be collapsed for the purpose of shipment or easy handling. However, if desired, the liner 9 may be scored across the space 5 and along the lines 3 and 4 to facilitate collapse of the liner into substantially flat condition.

The liner blank may be cut to shape, or punched to provide, the apertures 2, perforated to provide the lines of perforations 3 and 4 and scored for folding purposes automatically on a cutting and scoring machine in a single operation. Gluing of the side portions 10 and 11 of the liner blank can also be performed automatically on a suitable automatic gluer.

In packing fruit, the liner is opened to the expanded position (as shown in Fig. 3), and disposed in inverted position on a facing plate or base (not shown) in a manner which will be understood by those skilled in the art. Thereafter a reinforcing shell (not shown) is disposed over the liner and the liner filled in a known manner, whereafter the reinforcing shell is removed and the basket to be filled is inverted over the liner. The liner and basket are then inverted to upright position and the basket shaken to cause the fruit to settle and adjust itself to fit tightly within the basket, and a suitable cover may be applied and secured to the basket in any desired manner.

The completed fruit package, as illustrated in Fig. 4, comprises a basket 12 in which the liner 9 is disposed and lies against the walls of the basket surrounding the articles of fruit 13, and a cover 14, secured on the basket 12 to retain the fruit therein.

When the basket has been packed in the manner above-described, any abnormal pressure, in excess of a predetermined pressure, developed in the body of fruit, owing either to the shaking during packing or the pressure developed when the cover is applied, will cause the liner to break outwardly along one or more of the perforated lines 3 and 4, thereby relieving the fruit from this abnormal or excess pressure. In Fig. 4 there is illustrated the condition wherein the fruit 13 in the bottom portion of the basket has caused the liner 9 to break along the perforated line 4, and thus caused the adjacent edge portions 17 and 18 to separate and expand outwardly. Should the liner 9 be too large for the upper end of the basket 12, the liner 9 will break along the perforated line 3, and the portions 15 and 16 adjacent the break will overlap to adjust the liner 9 to the size of the basket 12 and contained fruit 13. The portion 5 between the interior ends of the lines 3 and 4 does not break, but constitutes a continuous, unbroken belt 19 which prevents the liner as a whole from separating and spreading.

It should be understood that where the basket and contained fruit are slightly larger than the liner throughout substantially its entire length, the edges 17, 18, 15 and 16 and the corresponding edges adjacent lines 6 and 7 all will expand outwardly; however, owing to the fact that the central belt 19 does not break, the liner will not separate entirely, and thus will prevent the fruit from coming in contact with the inner wall of the basket throughout any substantial area. In Fig. 4, the condition of the liner has been somewhat exaggerated for the sake of illustration.

It is well known that there is considerable variation in the size of baskets of the same type, even though all of the baskets are supposedly of the same shape and size. Preferably, the circumference of the liner will be chosen so that it does not exceed that of the smallest basket of the lot with which the liner is to be used. Since the liner according to the present invention permits self-expansion in accordance with the internal pressure of the fruit, the liner will expand to permit a full basket-load of fruit to be contained in the basket. The belt 19 is sufficiently short to prevent undue cramping of the fruit within the basket.

Preferably, in accordance with the present invention, the liner 9 is formed of sufficiently tough material so that the breaking of the liner 9 caused by abnormal pressure from within, in excess of the predetermined pressure, will be localized in and confined to the predetermined lines of breakage 3 and 4, and the liner 9 will not break at any other points. Also, the central belt 19 is of such length that it will not break but will twist and bend to permit adjustment of the fruit within the basket. The material from which the liner is constructed, preferably, is sufficiently pliant and flexible to permit ready adjusting movement of the fruit within the liner to prevent bruising or crushing of the fruit. However, the material is of sufficient stiffness to prevent appreciable curling or fraying of the end edges of the liner, and more particularly fraying and curling of the edges adjacent the lines of breakage.

Although a satisfactory liner may be provided in which there are only two diametrically opposed lines of weakening, or perhaps only a single line of weakening, it is sometimes desirable to provide numerous lines of weakening, spaced around the circumference of the liner, so that undue pressure at any point may be relieved as near as possible to the point of application of the pressure. Also, the provision of a considerable number of lines of weakening permits the liner to separate only a small amount at each point of abnormal pressure, and thus only a relatively small area of the fruit can come into direct contact with the walls of the basket. Thus, the amount of abrasion of the fruit caused by direct contact between the fruit and the basket is substantially eliminated or at worst confined to a relatively small area and a relatively small number of separate pieces of fruit.

As pointed out above, the unperforated belt portion 19 of the liner between the aligned lines of weakening 3 and 4 is of sufficient length and strength to resist breaking when the lines of weakening are broken out due to abnormal pressure. In order to ensure that the breakage will be confined to the lines of perforations and that the liner will not tear beyond these lines of breakage, short transverse lines of perforations may be provided at the interior ends of the lines of weakening.

A construction of this type is shown in Fig. 5, wherein a blank 20 is shown with two rows of ventilating openings 21, and lines of perforations 22 and 23 extending longitudinally inwardly from the end edges 6 and 7, respectively. Extending perpendicularly to each line 22 and intersecting the same at its interior end, is a short line of perforations 24, and a similar perforated line 25 intersects the interior end of each line 23.

When abnormal pressure is applied to the interior of the liner, one or more of the lines 22 and 23 break and the adjacent portions of the liner expand outwardly, and the liner may expand until these lines 22 and 23 are torn throughout their lengths. Breakage of the liner is, however, confined to the lines of weakening 22 and 23, by the transverse lines 24 and 25.

It is not necessary that the lines of weakening be confined to two diametrically opposed lines, but the lines may be disposed in any desired, spaced relation along the circumference of the liner. Instead of providing two pairs of aligned lines of weakening extending inwardly from the end edges of the liner, the lines may be staggered and extend alternately from opposite ends of the blank. In Fig. 6 is shown a blank 30 provided with two rows of ventilating openings 31 and lines of perforations 32, 34 and 35 spaced in staggered relationship around the blank. The lines 32 and 35 extend inwardly from one end edge of the liner, and one or more intermediate lines 34 extend inwardly from the other end edge. The lines 32, 34 and 35 each may extend to the central circumference of the blank. Score lines 32 and 36 in prolongation of the lines 34 and 35 may be provided to permit the blank, when formed into a liner, to be readily folded to collapsed condition for packing in a bundle with other similar liners.

Another modification of the invention is illustrated in Fig. 7, wherein a blank 40 is provided with the usual ventilating openings 41 and with spaced lines of perforations 42 and 45, arranged in staggered relation and extending from opposite end edges through a substantial distance along the length of the liner and beyond the central circumference. The lines 42 which extend inwardly from the lowermost end edge (as shown in Fig. 7) may be intersected at its interior end by a short transverse line of perforations 43. The lines 45 intermediate the lines 42 and 47 extend inwardly from the opposite end edge, and may be likewise intersected by the transverse, perforated lines 46. If desired, score lines 44 and 49 may be provided in prolongation of lines of perforations 42 and/or 45 to permit bending of the blank along these lines. However, such score lines may not be necessary where the lines of perforations extend into the blank a substantial distance, as the perforations provide fold lines.

Instead of providing lines of perforations, all of which extend inwardly from one or both end edges of the liner, the lines may be arranged in echelon formation, the first and last lines of this formation intersecting opposite end edges of the blank.

This construction is illustrated in Fig. 8, wherein a blank 50 is provided with ventilating openings 51 and an echelon series of lines of weakening 52, 54 and 55 spaced at equal intervals across the blank. The line 52 extends inwardly from one end edge of the blank to a point approximately centrally of the liner. The line 54 extends from a point spaced inwardly from one end edge approximately one-quarter the length of the liner to another point spaced inwardly a distance approximately one-quarter the length of the blank from the other end edge of the blank. The third line 55 begins at the end edge of the blank opposite to the edge intersected by the line 52, and terminates mid-way of the liner. The perforated lines 52, 54 and 55 may be shorter or longer than above specified, depending upon the material used, the basket irregularities and other conditions. If desired, score lines 53 and 56 may be provided in prolongation of lines 52 and 55, respectively, to provide fold lines.

It will be understood that it is generally desirable to provide, in the liner blank, spaced apertures or openings distributed substantially equally along the liner, for the purpose of permitting circulation of air through the fruit basket. Such openings may be employed in connection with the lines of perforations, as illustrated in Fig. 9.

Although the ventilating openings may be distributed in any desired manner, preferably they are arranged in two or more concentric arcuate rows, each spaced inwardly from an end edge of the liner a distance equal to one-fourth to one-third the length of the liner. The openings may be employed in a manner similar to the short transverse lines described in connection with the modifications shown in Figs. 5 and 7, and may serve as means for preventing tearing of the blank beyond the ends of the lines of weakening.

As shown in Fig. 9, a blank 60 may be provided with an arcuate row of ventilating openings 61 spaced from one end edge, and a second arcuate row of openings 62 spaced from the other end edge. Lines of weakening 63 extend from the corresponding end edge to the openings 61, and lines of weakening 64 extend from the other end edge to the corresponding openings 62. It will be seen that when the blank 60 is formed into a liner, and abnormal pressure is applied to the interior of the liner, the liner will separate along one or more of the lines of weakening 63 and 64, and will expand outwardly to relieve such abnormal pressure. When the break along any line 63 or 64 extends as far as the openings 61 and 62, the liner will expand outwardly at the portions surrounding the aforesaid openings, and thus will relieve the abnormal pressure and prevent further tearing of the liner.

The blank 60 is provided with score lines 65 and 66 spaced at such points that when the blank 60 is formed into a liner the lines 65 and 66 will lie at diametrically opposite points. Thus, the liner may be collapsed in folded condition for convenience in packing and shipping. At this point it should be noted that it is within the contemplation of the invention to provide lines of perforations in position to form natural fold lines for the liner and thus obviate the necessity for score lines, but where the arrangement of lines of perforations is not suitable for providing fold lines additional scoring may be provided in addition to the lines of weakening. The manner in which the fold lines and lines of weakening are provided will depend upon the type of fruit to be packed, the shape and size of the basket or container, and other considerations known to those skilled in the art.

It will be understood that, instead of providing transverse lines of weakening and ventilating openings adjacent ends of the lines of weakening, it is possible to provide reinforcing of the liner at the ends of the lines of weakening. Thus, instead of providing additional weakening of the liner, as has been disclosed above, patches or staples or analogous reinforcing means may be applied to the liner at the critical points to provide against undesired tearing of the liner.

As stated above, the concept of employing the ventilating openings as means for preventing undesired tearing of the liner beyond the lines of weakening, is not confined to any one arrangement of perforations or lines of weakening, and the lines of perforations may be staggered or arranged in echelon or otherwise, as is found desirable. In Fig. 10 a staggered arrangement of lines of perforations expand to ventilating openings, as shown. A blank 70 is provided with an arcuate row of ventilating openings 71, and extending from alternate openings 71 to the corresponding end edge of the line are lines of perforations 73. Similarly, an arcuate row of perforations 72 is provided, spaced from the opposite end edge of the liner, and a series of lines of weakening 74 extend from alternate perforations 72 lying opposite the perforations 71 disposed intermediate the perforations 71 from which the lines 73 extend. The score lines 75 and 76 are suitably positioned to permit folding of the completed liner.

A very satsfactory liner which permits outward expansion at any one of a number of points may be provided by disposing lines of weakening in a series of echelon formations, as shown in Fig. 11. A blank 80 is provided with an arcuate row of ventilating openings 81 spaced from one end edge and a similar row of perforations 82 spaced from the other end edge. An echelon series of lines of weakening 83, 84 and 85 may be provided, the lines 83 extending from one end edge to one of the openings 81, the line of weakening 84 extending from the adjacent opening 81 to the adjacent opening 82 of the other row of perforations, and the line 85 extending from the next adjacent perforation 82 to the corresponding end edge of the liner. This pattern of lines of weakening is repeated to provide echelon series of lines of weakening. It will be obvious that as many series of lines of weakening may be provided as desirable to permit satisfactory expansion of the liner, and that the arrangement of ventilating openings may be selected which is most convenient for providing the desired arrangement of lines of weakening.

It should be understood that it is preferable according to the present invention to form the lines of weakening by punching in the liner a series of closely-spaced perforations which may take the form of small circular perforations or may be constituted by a series of aligned slots preferably not exceeding $\frac{1}{16}$ inch in length and separated by a space not exceeding $\frac{1}{32}$ inch. The perforations may also comprise spaced cuts or lacerations extending only partly through the paperboard leaving enough material so that the liner will break when a predetermined pressure is applied. Various sizes, spacing and types of perforations may be employed depending upon the nature, thickness and strength of the material, the size and stiffness of the liner, and the character and weight of the fruit and vegetables to be packed therein. The arrangement for providing the lines of weakening may take other forms, for example, score lines in which the material of the liner is heavily scored to reduce its strength, or cut lines extending only part way through the material. Other means for weakening the liner also may be employed, as will be apparent to those skilled in the art of paperboard manufacture.

The liner may have a line of perforations which comprises a series of substantially rectangular, open slot-like perforations 90 extending all the way through the material from which the liner is formed, and spaced apart a distance 91 which may be less than the length of each perforation. Although the size and spacing of the perforations 90 may be varied considerably, the proportions shown provide a relatively weak construction which permits a ready breaking of the liner along the line of weakening constituted by the perforations 90.

Where a stronger construction is desired, in order that the liner may not break as readily, the arrangement shown in Fig. 13 may be employed. This arrangement consists in punching or cutting indentations 92 in the material from which the liner is formed, which indentations may, for example, have substantially the same or a greater length and width than the perforations 90, and may be spaced apart a distance 93 corresponding to the spacing 91. However, the indentations 92 extend only partially through the liner and thus provide a considerably stronger construction than where perforations are used. The fact that the liner is not broken all the way through, and the tensile strength of the surface is retained, provides a construction which permits ready bending along the line of weakening without premature breaking at this point, even under considerable stress.

Still another modification of the line of weakening may consist of a series of closely-spaced, cone-shaped depressions or indentations 94 formed in the liner and extending a substantial distance therethrough, but preferably not entirely through the material. The depressions or indentations 94 may be separated a distance 95, somewhat less than the thickness of the material, although this spacing will depend upon the tensile strength desired.

Instead of forming the lines of weakening by cutting, perforating or indenting the material from which the liner is formed, the material may be deeply scored (as shown in Fig. 15) a sufficient amount to cause distortion and weakness along the line of scoring. Preferably, in such an arrangement the scoring operation consists in providing a deep, continuous, longitudinally-extending groove 96, to thereby distort the material 98 adjacent the bottom of the groove to cause the same to be displaced from the plane of the liner. Thus sufficient weakening is produced along the score line to cause the liner to tear along this line when a predetermined tensile stress is applied thereto.

Although the liner forming the subject matter of the present invention may be employed in packing a basket according to the process above described, it is equally well adapted for use in other packing processes. For example, the basket may be disposed in its normal upright position and the liner inserted in the basket prior to the introduction of any fruit or other articles to be packed in the basket. Thereafter the fruit or articles may be inserted individually or all simultaneously to fill the basket and the liner will protect the fruit in the same manner as in the previously described process and will break along the lines of weakening to permit the fruit to adjust itself to the shape and size of the basket in the manner above described. Irrespective of which method of packing is employed it will be seen that a minimum number of operations are required in connection with the use of the liner constructed according to this invention. It is necessary only to insert the liner in the basket in the desired manner and the liner will then automatically break to allow the fruit to adjust itself within the liner and no extra operation such as removing a connecting member is necessary. The materials used in making my liner possess sufficient tensile strength to confine the breaking of the liner to the weakened portions and hence the amount of pressure necessary to cause breaking of the liner may be readily predetermined by suitable selection of the arrangement and nature of the lines of weakening. Thus the likelihood of premature or undetermined breaking of the liner is reduced to a minimum. By reason of the relatively stiff nature of the liner, there is little or no tendency for the end edges or the edges adjacent the breaks to fray or curl as is the case in liners where the material is extremely flexible and flimsy. Furthermore, because of the inherent stiffness of the liner and because of the fact that the liner does not break throughout its entire length but retains its endless collarlike form, the liner does not collapse or become displaced even when the basket has been completely emptied, thus the package retains its neat appearance throughout its entire period of use.

Not only is the breaking of the liner confined to predetermined areas circumferentially of the liner but the extent of breakage in a direction longitudinally of the liner also is predetermined. Preferably at least some of the lines of breakage intersect the end edges of the liner inasmuch as it has been found that usually the abnormal pressure is developed at these portions of the liner. In the present invention the interior ends of the lines of weakening may, if found necessary, be provided with adjacent means such as transverse lines of weakening, ventilating openings or analogous means for permitting additional expansion of the liner adjacent the interior ends of the lines of weakening in order to prevent tearing of the liner beyond the ends of the lines of weakening.

The present invention provides a liner which permits adjustment of the fruit within the basket by reason of the liner expanding outwardly after it has been caused to break along the lines of weakness, and thus relieves abnormal pressure. This liner also is adapted to adjust itself to fit in a basket wherein one or the other of the ends of the basket may be either oversized or undersized. Because of the particular construction, this liner in several of the embodiments not only breaks outwardly but the upper and lower portions of the liner are permitted to rock about a continuous central belt and thus one end of the liner may expand while the other contracts or vice versa. Thus a liner is provided which is highly adaptable to various conditions of use.

Because of the fact that no additional securing means are necessary for the ends of the strip from which the liner is formed, there is no internal bulge on the liner other than the seam where the ends of the strip are joined, which seam does not project an objectionable amount. Thus, no bruising of the fruit is caused as is often the case where a detachable element such as a rod or wire is employed, which element has a relatively small surface which may bear against the fruit under relatively high unit pressure and cause bruising or grooving of the surface of the fruit. Furthermore the likelihood of bruising of the fruit is minimized by the present invention, for the reason that only a relatively small area of the basket at any one point is permitted to contact the fruit.

The present invention contemplates a liner, preferably formed from a single sheet of paperboard material. This liner may be formed entirely on automatic machinery and without necessitating manual operations in either forming the liner or assembling the same. The liner not only may be easy and inexpensively manufactured, but readily may be folded and assembled with a number of similar liners to form a convenient package for handling and shipping.

While certain novel features of the invention have been disclosed and are pointed out in the annexed claims, it will be understood that various omissions, substitutions and changes may be made by those skilled in the art without departing from the spirit of the invention.

What is claimed is:

1. A liner for packing fruit comprising an endless wall adapted to be disposed in a fruit container and having lines of weakening extending longitudinally thereof from at least one of the end edges to points intermediate the ends of the liner, and a centrally disposed, continuous, circumferential belt free of lines of weakening, said lines of weakening being of such strength as to support a column of fruit within the liner but capable of breaking under abnormal pressure and said central belt and the remainder of said liner being of sufficient strength to limit such breaking to said lines of weakening.

2. A basket liner comprising a strip of paperboard material having its ends permanently joined to form an endless wall, said liner being of sufficient strength to support a column of fruit and having aligned, longitudinally extending lines of weakening extending from the end edges thereof to permit breaking of the liner along said lines under predetermined settling or leveling pressure, said liner having a continuous circumferential belt free of said lines of weakening and of sufficient strength to resist breaking under said abnormal pressure and sufficiently flexible to permit rocking of the end portions of the liner thereabout when said liner breaks under said abnormal pressure.

3. A basket liner for packing fruit comprising an endless wall of sufficient strength to support a column of fruit during assembly with a container and having portions weakened to permit breaking of the liner under predetermined settling pressure, said weakened portions being constituted by a plurality of lines of weakening each extending inwardly from an edge of said liner and throughout only a portion of the length of the liner, said lines spaced from one another circumferentially of the liner, said liner having a continuous zone extending around its entire periphery intermediate the margins of the liner, said zone being free of lines of weakening and of sufficient strength to prevent complete separation of said liner when in use.

4. A basket liner including a strip of paperlike material having its ends permanently secured together to form a substantially endless wall and having lines of weakness extending throughout a portion of the height of the wall, said wall being of sufficient strength to support a column of fruit during assembly with a container and said lines of weakness being sufficiently weak to permit rupture of said liner under predetermined packing pressure, said liner being of sufficient strength to confine the rupture to the lines of weakness and to a continuous band intermediate the top and bottom marginal zones of the liner and thereby prevent complete separation of said liner when in use.

5. A liner for packing fruit comprising an endless wall of paperlike material of sufficient strength to support a column of fruit and having at least one line of weakening extending longitudinally thereof and intersecting the end edges to permit breaking of the liner under predetermined settling or leveling pressure, said line being interrupted intermediate its ends whereby the wall has a continuous unweakened band spaced from its edges, said liner being of sufficient strength to confine the breakage to the line of weakening and to prevent breakage of said band.

6. A basket liner comprising a strip of paperlike material having its ends joined to form an endless collar capable of supporting a column of fruit, said collar having lines of weakening extending inwardly across the end edges respectively and arranged in alignment, the inner ends of said lines being spaced whereby a continuous unweakened band remains spaced from the edges of the collar, said lines permitting said liner to break under predetermined settling or leveling pressure, and lines of weakening extending transversely of said first lines adjacent the inner ends thereof whereby to provide means for halting the breakage of said liner at the inner ends of said first lines.

7. A basket liner comprising an endless wall of paperlike material of sufficient strength to support a column of fruit, a plurality of spaced ventilating openings in said wall, and a plurality of lines of weakening rendering said liner capable of breaking under a predetermined settling or leveling pressure, each of said lines extending inwardly from an end edge of said wall and terminating at a ventilating opening, said liner having a continuous unweakened band intermediate the edges and capable of resisting breakage due to said settling or leveling pressure.

8. A basket liner comprising an endless collar of paperlike material of sufficient strength to support a column of fruit, and having a row of ventilating openings spaced from each edge, and lines of weakening capable of breaking under predetermined settling or leveling pressure, said lines extending inwardly from each end edge of said collar and intersecting at least certain of the openings of the corresponding row, said lines terminating at the openings whereby the material between said rows constitutes a continuous, unweakened band capable of withstanding said settling or leveling pressure.

OLIVER B. ANDREWS.